Figure 2:
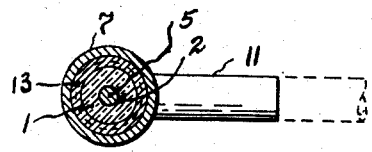

March 1, 1960  N. A. SZULC ET AL  2,926,885
GLASS NEEDLE VALVE
Filed Aug. 2, 1954

INVENTORS
NICHOLAS A. SZULC
KALEV PUGI
By Frederick E. Bromley
ATTY.

2,926,885
GLASS NEEDLE VALVE

Nicholas A. Szulc and Kalev Pugi, Kingston, Ontario, Canada, assignors to Ray Glass Limited, Toronto, Ontario, Canada, a corporation of Ontario Application August 2, 1954, Serial No. 447,127

1 Claim. (Cl. 251—214)

This invention relates to valves, stop-cocks and the like.

In more particularity, the invention contemplates an improved arrangement for the controlled translation of fluids or gases whose chemical nature prevents the use of ordinary metallic valves.

It is known to provide valve mechanisms comprised of mixtures of glass and certain plastics of the polymer groups which are indifferently interested in chemical reaction with highly active alkaline or acid solvents.

In prior art arrangements it has been found difficult to provide a satisfactory valve mechanism in which the re-agents could be confined entirely to areas comprised on non-reactive materials. Glass stop-cocks, metal valves containing glass or other plastic inserts have been found to exhibit indifferent reliability.

The increased pressure on the development of chemically unstable isotopes has given rise to great urgency for the provision of valving devices which are not readily attacked by so called radio-active substances which in many cases are also highly reactive in the older chemical sense.

The applicants have discovered how to devise a valving device which satisfactorily meets the requirements of workers in these new and difficult fields.

According to our invention we provide a valve device including a body containing a bore having a precise predetermined dimension, one end of said bore being connected to receive a substance to be controlled, an outlet conduit positioned along said body and providing an exit passage from said bore, a plunger, precisely dimensioned to reside within said bore so as to effectively seal said bore over a length which is at least two times greater than the diameter thereof, and means for actuating said plunger to controllably seal off and open the said exit passage.

It has been observed by us that most valves fail for the reason that the seal is not long enough, and is not of sufficient precision in design of fits.

It is admittedly difficult to mould, cast, or extrude whole valve mechanisms so as to obtain features such as a class 3 fit between threaded, tapered or sliding portions of a mechanism. We avoid these difficulties by using strictly tubular and/or cruciform shapes for our valve. We then precision grind the bores in these tubular members and also precision grind the plunger so that when plunger and bore are en-meshed, the fit is not only of a high order but also provides a very long leakage path of very high resistance to the flow of material in in unwanted direction. The length of this leakage path can be chosen in accordance with the pressure exerted upon the end of the plunger, and in further accordance with the viscosity of the material being conducted through the valved system. The effectiveness of this seal can be further enhanced by the inclusion of viscous damping between the wall of the bore and the surface of the plunger.

By making the wall of the body-tube of substantial thickness, the upper portion of the fluid tube can be grooved and a control agency such as a screwed cap and thumb screw can be affixed thereto to cooperate with the end of the plunger which is remote from the fluid region.

In a further aspect by selection of a predetermined pitch for the said thumb-screw, a very precise and wide range of control can be effected.

Figure 1:
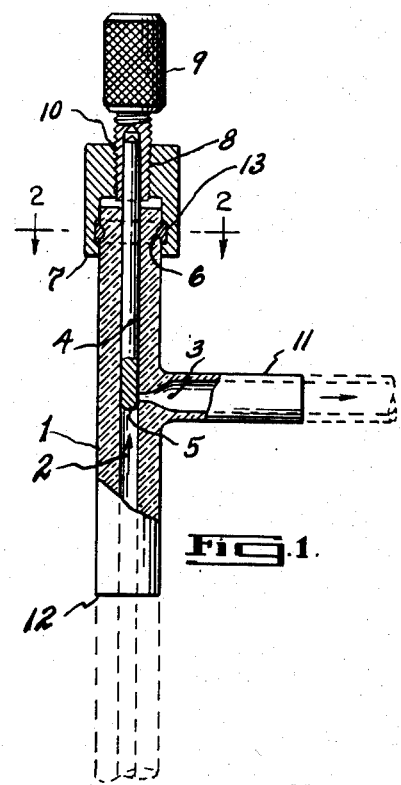

These inventive concepts will now be further elucidated by description of a typical example of construction in accordance therewith, the text being aided by reference to the accompanying drawings wherein:

Figure 1 presents partly in section a side view of a valve incorporating the features of our invention.

Figure 2 is a section along lines 2—2 of the structure as depicted in Figure 1.

Figure 3:
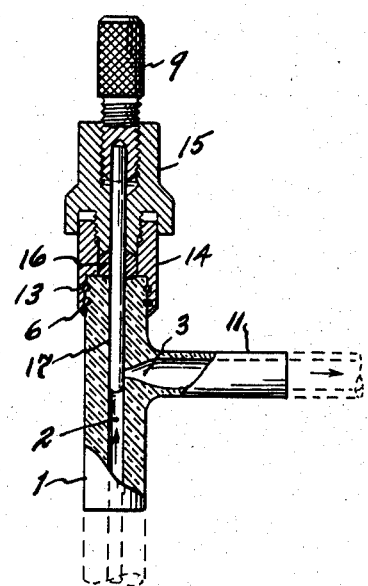

Figure 3 presents mostly in section a valve according to our invention but disclosing a modification in the design of the control head.

Figure 4:
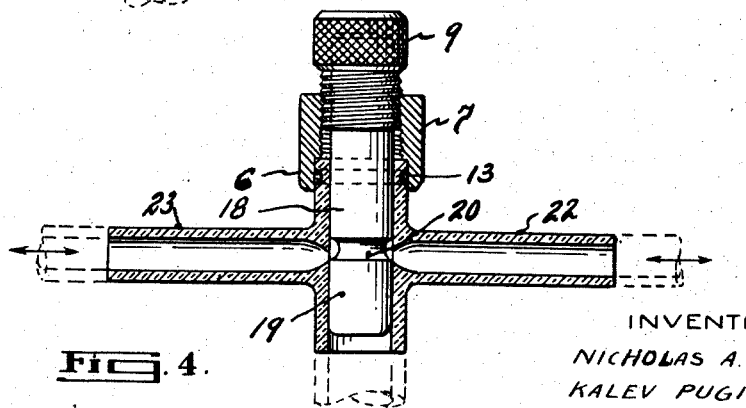

Figure 4 depicts in section a side view of a "straight-through" version of our invention.

Referring now to these figures, 1 is a tubular body having a precisely dimensioned bore 2 and an exit passage 3. A plunger 4 is precision ground to at least a class 3 fit in bore 2 and its distal end 5 is shaped to seal off the passage 3, gradually when the plunger is pressed downward past the aperture at 3.

The upper portion of the tubular body contains one or more grooves 6 and is fitted with a cap nut 7 having a threaded portion 8. A threaded thumb screw 9 co-acts with the thread 10 in nut 7. Thumb screw 9 is rigidly attached at its distal end to the upper end of the plunger 4. The bore 2 above the passage 3 and the plunger 4 constitute the seal which prevents escape of the controlled material in any unwanted direction: the length of the cooperating portions of 2 and 4 should never be less than twice the diameter of the plunger and should preferably be at least ten times the said diameter. The greater this length is made, the better the seal.

It is desirable to provide viscous damping of the plunger by coating it before insertion in the bore with a suitable refractory lubricant, such as colloidal graphite and/or silicone oil.

The spout 11 and the distal end of tubular body 1 at 12 are readily attached in known manners to the apparatus with which the valve is to be used.

The cap nut 7 is preferably bonded to the tube 1 by filling the groove 6 in body 1, and 13 in cap nut 7 with cement or alternatively (for low pressure applications) with a resilient gasket.

The body 1 and spout 11 are preferably made of glass and the plunger 4 may also be glass. It is evident also that for severe requirements, the nut 7 and thumb screw 9 could also be of glass, the material at 13 being a glass cement. The advantage of this design will be evident. The parts requiring precision of fit, that is, the bore 2 and plunger 4 can be readily machined, no matter of what material they are made. The control fittings 7, 8, 9, 10 need not be precisely fitted and can therefore be rough machined, cast or molded without subsequent rework and from any suitable material. The pressure end of plunger 4 is rounded as shown in order to secure a linear control of fluid flow. In certain usages of the valve the thumb screw and/or the cap nut and/or body 1 may be made of a suitable plastic, metal or other material as occasion demands. The plunger will likewise be made of a material compatible with the use of the valve, this may be metal, glass or plastic.

The modification depicted in Figure 3 shows a more elaborate control head. In this case the tube 1 is fitted with two grooves 6 and 13 and an intermediate head piece 14 is cemented to the tube 1. This head piece may be coarse-threaded to receive a modified cap nut 15 to receive the thumb screw 9. A space within head piece 14 includes a gasket material 16 which may be graphite, lead, asbestos, or alternatively, may comprise a decontaminating chemical to absorb or render harmless any gas or liquid which may have leaked past the seal 17. For the purposes of this specification the material 16 is referred to as a "buffer." It is evident that parts 14 and 15 can also be readily machined, molded or cast, even when made of glass, but will be of metal or plastic.

Figure 4 depicts a "straight-through" type of valve incorporating the features of the invention. In this case the precision workmanship is confined to the portions 18, 19, and the bore and the plunger 19 in this case includes an annular groove 20 by which to open and close the passage between lines 22, 23 when thumb screw 9 is turned.

It will be evident that the unique valve design herein disclosed is a great improvement over prior art arrangements since it comprises only two parts requiring high manufacturing precision and these yield to straightforward mass production techniques no matter what materials are involved so long as they are stable substances of rigid character. By increasing the length factor of the plunger-and-bore coincidence, any practically useful degree of seal can be achieved without greatly increasing the cost of the valve. Furthermore the sealed plunger-to-bore design renders it possible to apply our idea of a buffer 16 to such a structure so that it can function effectively. Workers in the field of micro-physics will appreciate the value of this buffer device.

It is also evident that since the valve according to our invention can be made to open and close very deliberately, the thumb screw 9 may have many or few threads so as to make the action fast or slow as required. The movement of the thumb screw can therefore be readily mechanized. It can be operated in a simple manner by levers, magnets, pneumatic or hydraulic motors, electric and servo-mechanisms and the like.

In a further aspect, since the actual valving parts are precision made and the aperture 3 is in the side of a precisely dimensioned bore, and since the distal end of the plunger 4 can be accurately shaped, the flow-rate through the valve can be so precisely controlled that the thumb screw 9 and/or serving mechanisms associated therewith can be calibrated in flow units with a very high degree of repeatable accuracy.

In many cases the cap nut 7 and thumb screw 9 can be made of metal, even when handling highly reactive fluids or gases. Thus these parts can also be machined to high accuracy. In this form of our invention the control agencies 7 and 9 can be calibrated to provide very much more accurate flow-metering than has been possible with prior art constructions of comparable manufacturing cost and/or of correspondingly long serviceability.

It will be evident that the parts which can come into contact with highly active reagents can be made of glass, "fibre-glass," polymethyl methacrylates, tungsten carbide or any material that can be ground to a fine tolerance in simple rotating fixtures or centreless grinders. The tube 1 can be die cast from refractory materials, or it can be cast cheaply by the "lost wax" method so as to provide a bore of very precise dimension without additional machining. The plunger can then be centreless ground to an exact fit without difficulty. The remaining parts of the valve have no critical dimensions and yield to any convenient manufacturing technique. Therefore a valve according to our teachings can be made readily from whatever materials are suitable as being non-reactive with the fluid or gas to be passed by the valve. The only limitation is that the material itself must be mechanically stable.

An inferior form of our valve could be devised in which the length of seal would be less than the minimum factor of two as defined. In practice we prefer to use a factor of at least 10 for the length-diameter ratio of the plunger. Lengths greater than 10 tend to become unwieldy, and for severe requirements of sealing we prefer to resort to the embodiment described with reference to Figure 3 rather than to increase the length of the main seal.

Various modifications of the above exemplifications will occur to those skilled in the art and all such as lie within the broad spirit of our invention are to be regarded as lying within the ambit of the appended claim.

What is claimed is:

A metering valve device for precision metering of corrosive fluids comprising a hollow tubular glass body portion the inside of which defines a straight through cylindrical bore of uniform diameter and having a surface of high finish, a glass inlet connection for supplying to said bore a fluid to be metered, said inlet connection being integral with and at right angles to said hollow body portion, a glass exit connection integral with said hollow body portion and aligned with said inlet connection, said inlet and exit connections being of a glass capable of being fused to tubing of similar material, a cylindrical plunger of relatively chemically inert, relatively rigid material having a surface of high finish located in said bore to provide a very close fit therewith and a correspondingly long leakage path, an annular groove on said surface and extending circumferentially thereof, the length of said plunger being at least twice its diameter below the groove and being at least twice its diameter above the groove, a fine-threaded member of diameter at least equal to the diameter of the plunger fixedly attached to said body portion, a cooperating threaded member fixedly attached to an end of said plunger, said plunger extending outwardly beyond said straight through bore in all plunger positions for cooperation with said threaded member on said body portion, the last said member cooperating with said threaded member on said plunger to move the plunger to and fro in said bore to adjust the extent of flow of fluid to be metered through said aligned connections, axial leakage around the plunger both above and below the connections being prevented solely by the long leakage path and by the very close fit between plunger and bore.

References Cited in the file of this patent

UNITED STATES PATENTS

| | | |
|---|---|---|
| 297,426 | McGinley | Apr. 22, 1884 |
| 851,370 | Nolan | Apr. 23, 1907 |
| 867,780 | Auchu | Oct. 8, 1907 |
| 1,027,136 | Mauran | May 21, 1912 |
| 1,488,878 | Heath | Apr. 1, 1924 |
| 1,538,346 | Mueller | May 19, 1925 |
| 1,886,159 | Brown | Nov. 1, 1932 |
| 2,037,873 | Angell | Apr. 21, 1936 |
| 2,084,397 | Hildebrandt | June 22, 1937 |
| 2,304,491 | Allen | Dec. 8, 1942 |
| 2,412,597 | Brewer | Dec. 17, 1946 |
| 2,594,611 | Banides | Apr. 29, 1952 |
| 2,796,887 | Stern | June 25, 1957 |

FOREIGN PATENTS

| | | |
|---|---|---|
| 625,102 | Germany | of 1936 |
| 930,786 | France | of 1948 |
| 451,745 | Italy | of 1949 |